United States Patent
Guthrie et al.

(10) Patent No.: US 6,403,247 B1
(45) Date of Patent: Jun. 11, 2002

(54) FUEL CELL POWER PLANT HAVING AN INTEGRATED MANIFOLD SYSTEM

(75) Inventors: Robin J. Guthrie, East Hartford; Thomas J. Corrigan, Coventry; Stanley P. Bonk, Tolland, all of CT (US)

(73) Assignee: International Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/454,020

(22) Filed: Dec. 3, 1999

(51) Int. Cl.[7] .................................................. H01M 2/00
(52) U.S. Cl. ............................ 429/34; 429/38; 429/17
(58) Field of Search .............................. 429/34, 38, 39, 429/26, 18, 17

(56) References Cited

U.S. PATENT DOCUMENTS

| | | | |
|---|---|---|---|
| 3,994,748 A | 11/1976 | Kunz et al. ................... 429/13 |
| 4,212,929 A | 7/1980 | Grevstad et al. .............. 429/37 |
| 4,910,099 A | 3/1990 | Gottesfeld .................... 429/13 |
| 5,316,747 A | 5/1994 | Pow et al. .................... 423/247 |
| 5,330,727 A | 7/1994 | Trocciola et al. ............ 422/177 |
| 5,358,799 A | * 10/1994 | Gardner ........................ 429/26 |
| 5,432,021 A | 7/1995 | Wilkinson et al. ............ 429/17 |
| 5,456,889 A | 10/1995 | Pow et al. ................. 422/173.1 |
| 5,482,680 A | 1/1996 | Wilkinson et al. .......... 422/177 |
| 5,486,430 A | 1/1996 | Gorbell et al. ............... 429/35 |
| 5,514,487 A | 5/1996 | Washington et al. .......... 429/39 |
| 5,518,705 A | 5/1996 | Buswell et al. ......... 423/437 M |
| 5,543,240 A | * 8/1996 | Lee et al. ...................... 429/38 |
| 5,798,186 A | 8/1998 | Fletcher et al. ............... 429/13 |
| 6,054,228 A | * 4/2000 | Cisar et al. ................... 429/18 |
| 6,159,629 A | * 12/2000 | Gibb et al. .................... 429/39 |

* cited by examiner

*Primary Examiner*—Stephen Kalafut
*Assistant Examiner*—R Alejandro
(74) *Attorney, Agent, or Firm*—McCormick, Paulding & Huber LLP

(57) ABSTRACT

An integrated manifold system for a fuel cell power plant includes a first fuel cell stack and a second fuel cell stack, wherein a common manifold is adapted to be in fluid communication with the first fuel cell stack and the second fuel cell stack. The common manifold includes a first plenum for diverting a first reactant to each of the first and second fuel cell stacks, and a second plenum for accepting the first reactant as the first reactant is exhausted from each of the first and second fuel cell stacks.

10 Claims, 10 Drawing Sheets

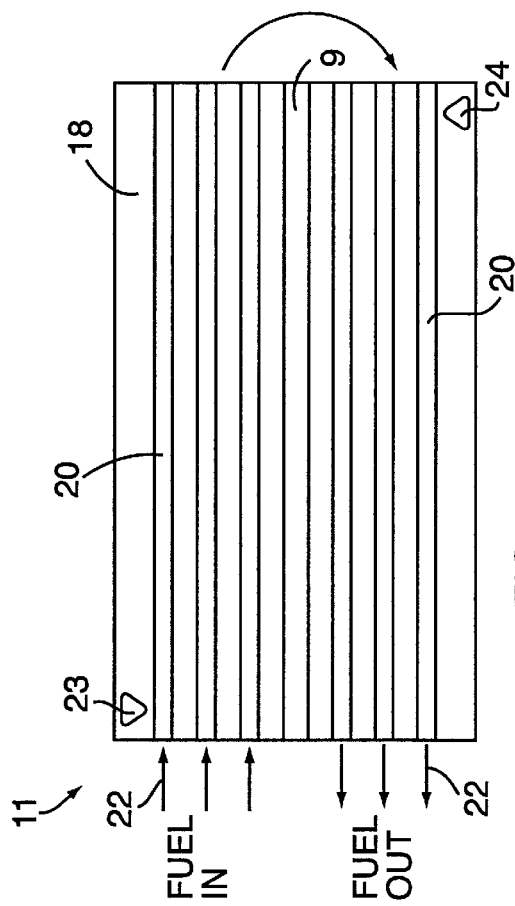
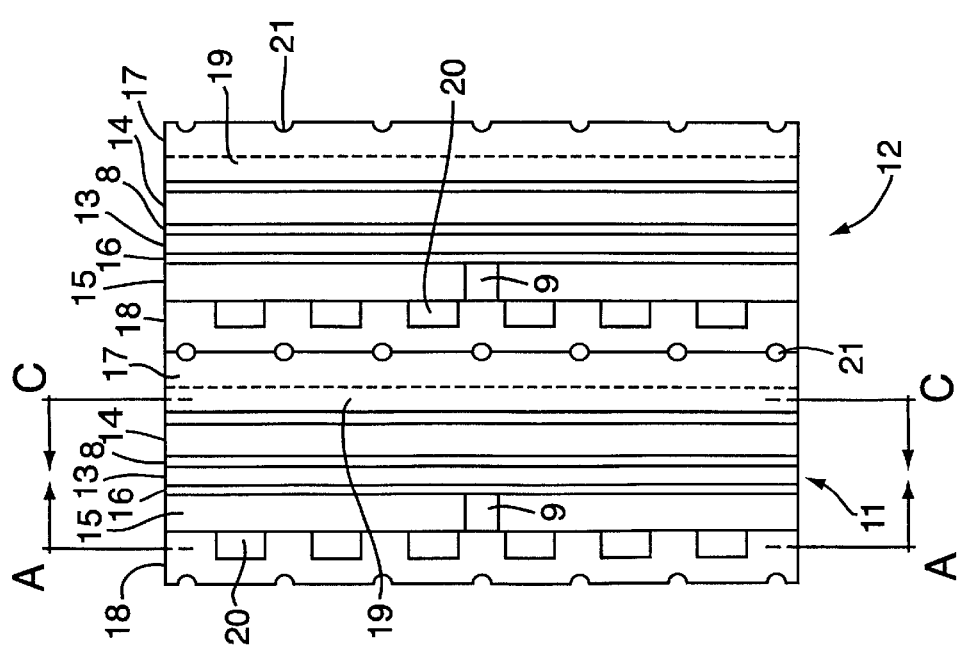

FUEL CELL POWER PLANT HAVING AN INTEGRATED MANIFOLD SYSTEM

FIELD OF THE INVENTION

This invention relates in general to a fuel cell power plant having an integrated manifold system, and deals more particularly with an integrated manifold system of a fuel cell power plant which uniformly delivers input reactants to the fuel cell power plant while reducing the overall weight and volume of the fuel cell power plant.

BACKGROUND OF THE INVENTION

Many types of fuel cells are known in the art, such as solid oxide, molten carbonate, phosphoric acid and proton exchange membrane (PEM) fuel cells. Fuel cells generate electricity by directly converting chemical energy to electrical energy. In a typical fuel cell, an electrolytic medium separates an anode and a cathode. A voltage is produced between the anode and cathode when a fuel is introduced to the anode, an oxidant is introduced to the cathode and the cell is maintained within the correct temperature range. The electrolytic medium allows an ionic species to travel between the cathode and the anode.

The products generated by fuel cells are relatively simple and benign, typically including water and carbon dioxide, thus minimizing environmental concerns. In contrast with fossil fuel based power sources, such as the internal combustion engine, fuel cells are simpler, quieter, non-polluting and have high operating efficiencies. For these and other reasons, fuel cells are considered promising power sources for the future.

In practice, however, operation of a fuel cell stack can be complex. Considerable hardware may be required to support a fuel cell stack, which is typically comprised of a plurality of individual electrically integrated fuel cell assemblies. Such hardware can include a thermal management subsystem for maintaining the fuel cell stack at the proper temperature, a water management subsystem for handling water generated as a reaction product of operating the fuel cell stack and for maintaining proper humidity throughout the power plant, a fuel subsystem for processing and delivering the fuel reactant to the fuel cell stack, and a blower for delivering the oxidant to the fuel cell stack. Taken as a whole, a fuel cell stack—or a plurality of electrically connected fuel cell stacks—and its operating subsystems comprise a typical fuel cell power plant.

As understood by one of ordinary skill in the art, the components and subsystems of a fuel cell power plant can vary depending on the application—a phosphoric acid stationary power plant for industrial use will differ from a mobile, typically (PEM), power plant. Furthermore, a mobile PEM power plant that can be provided with hydrogen as a fuel reactant can differ considerably from a PEM plant for installation in an automobile, which can be required to include a subsystem for producing hydrogen fuel from gasoline. In general, a fuel cell power plant includes those subsystem components necessary for the application for which the power plant is to be used, and that are appropriate to the type of fuel cells incorporated by the fuel cell power plant. In order to control the temperature within a fuel cell assembly, a coolant is provided to circulate about the fuel cell assembly, usually water.

Electrochemical fuel cell assemblies typically employ hydrogen as the fuel and oxygen as an oxidant where, as noted above, the reaction by-product is water. Such fuel cell assemblies may employ a membrane consisting of a solid polymer electrolyte, or ion exchange membrane, disposed between the two electrodes formed of porous, electrically conductive sheet material—typically carbon fiber paper. The ion exchange membrane is also known as a proton exchange membrane (hereinafter PEM), such as sold by DuPont under the trade name NAFION™, has a catalyst layer formed thereon which results in a membrane-electrode interface that promotes the desired electrochemical reaction.

In operation, hydrogen fuel permeates the porous electrode material of the anode and reacts with the catalyst layer to form hydrogen ions and electrons. The hydrogen ions migrate through the membrane to the cathode and the electrons flow through an external circuit to the cathode. At the cathode, the oxygen-containing gas supply also permeates through the porous electrode material and reacts with the hydrogen ions and the electrons from the anode at the catalyst layer to form the by-product water. Not only does the ion exchange membrane facilitate the migration of these hydrogen ions from the anode to the cathode, but the ion exchange membrane also acts to isolate the hydrogen fuel from the oxygen-containing gas oxidant. The reactions taking place at the anode and cathode catalyst layers are represented by the equations:

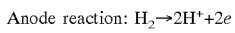

Anode reaction: $H_2 \rightarrow 2H^+ + 2e$

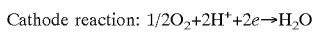

Cathode reaction: $1/2O_2 + 2H^+ + 2e \rightarrow H_2O$

Conventional PEM fuels cells have the ion exchange membrane positioned between two gas-permeable, electrically conductive plates, referred to as the anode and cathode plates. The plates are typically formed from graphite, a graphite-polymer composite, or the like. The plates act as a structural support for the two porous, electrically conductive electrodes, as well as serving as current collectors and providing the means for carrying the fuel and oxidant to the anode and cathode, respectively. They are also utilized for carrying away the reactant by-product water during operation of the fuel cell.

When flow channels are formed within these plates for the purposes of feeding either fuel or oxidant to the anode and cathode plates, they are referred to as fluid flow field plates. These plates may also function as water transfer plates in certain fuel cell configurations. When these plates simply overlay channels formed in the anode and cathode porous material, they are referred to as separator plates. Moreover, the plates may have formed therein reactant feed manifolds which are utilized for supplying fuel to the anode flow channels or, alternatively, oxidant to the cathode flow channels. They also have corresponding exhaust manifolds to direct unreacted components of the fuel and oxidant streams, and any water generated as a by-product, from the fuel cell. Alternatively, the manifolds may be external to the fuel cell itself, as shown in commonly owned U.S. Pat. No. 3,994,748 issued to Kunz et al. and incorporated herein by reference in its entirety.

The catalyst layer in a fuel cell assembly is typically a carbon supported platinum or platinum alloy, although other noble metals or noble metal alloys may be utilized. Multiple electrically connected fuel cell assemblies consisting of two or more anode plate/membrane/cathode plate combinations are referred to as a fuel cell stack. A single fuel cell stack is typically electrically connected in series.

Often, the particular application for which a fuel cell stack is utilized demands a system voltage which exceeds the capacity of a single fuel cell stack, due primiarily to the structural limitations on the size of such a fuel cell stack. That is, for a single fuel cell stack to generate extremely high voltages, the length of such a fuel cell stack would become impractical, leading to possible structural deformation of the fuel cell stack as a whole. In order, therefore, to compensate for these situations of high voltage demands, two or more fuel cell stacks may be utilized in combination to form the electric generating portion of a fuel cell power plant.

Multiple, operatively connected fuel cell stacks are particularly useful in various transportation applications requiring high voltages. There are, however, additional concerns associated with utilizing multiple fuel cell stacks in such applications, especially where the weight and volume of the constructed fuel cell power plant is of primary importance. In addition, when multiple fuel cell stacks are utilized, it becomes increasingly difficult to ensure the uniform distribution of fuel and oxidant reactants to each of the fuel cell stacks making up the fuel cell power plant.

With the forgoing problems and concerns in mind, it is the general object of the present invention to provide a fuel cell power plant having an integrated manifold system which overcomes the above-described drawbacks.

SUMMARY OF THE INVENTION

It is an object of the present invention to provide a fuel cell power plant with an integrated manifold system.

It is another object of the present invention to reduce the complexity and cost of a fuel cell power plant.

It is another object of the present invention to equip a fuel cell power plant with a common fuel or oxidant manifold.

It is another aspect of the present invention to integrate either the fuel or oxidant manifolds of a fuel cell power plant so as to reduce the weight and volume of the fuel cell power plant as a whole.

It is another aspect of the present invention to ensure the uniform distribution of fuel and oxidant reactants to the multiple fuel cell stacks making up a fuel cell power plant.

According to one embodiment of the present invention, an integrated manifold system for a fuel cell power plant includes a first fuel cell stack and a second fuel cell stack, wherein a common manifold is adapted to be in fluid communication with the first fuel cell stack and the second fuel cell stack.

The common manifold includes a first plenum for diverting a first reactant to each of the first and second fuel cell stacks, and a second plenum for accepting the first reactant as the first reactant is exhausted from each of the first and second fuel cell stacks.

These and other objectives of the present invention, and their preferred embodiments, shall become clear by consideration of the specification, claims and drawings taken as a whole.

BRIEF DESCRIPTION OF THE DRAWINGS

FIG. 1 illustrates a section taken through two PEM fuel cells arranged in series.

FIG. 2 is a simplified plan illustration of an anode side of a fuel cell, taken in section along line A of FIG. 1.

DETAILED DESCRIPTION OF THE PREFERRED EMBODIMENT

Figure 3:
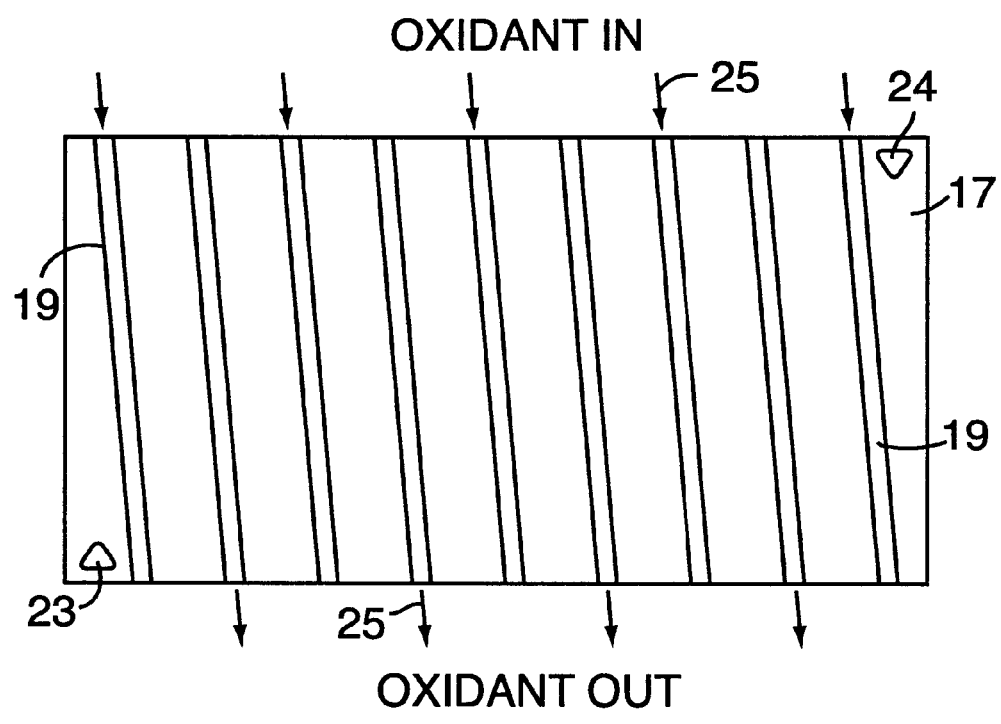
FIG. 3 is a simplified plan illustration of an cathode side of a fuel cell, taken in section along line C of FIG. 1.

FIG. 1 illustrates a sectional view of a partial fuel cell stack 10 having two electrochemical fuel cell assemblies, 11 and 12, arranged in series contact. Each fuel cell assembly, 11 and 12, produces only approximately 0.6–0.7 V when operated at rated power. In order to produce a desired power supply it is often necessary for a great many fuel cells to be electrically joined together. The fuel cell assemblies 11 and 12 each employ an ion exchange membrane 13 consisting of a solid polymer electrolyte disposed between an anode electrode substrate 15 and a cathode electrode substrate 14. The ion exchange membrane 13 is also referred to as a proton exchange membrane (PEM) and can be a plastic-type film approximately 0.001 inch thick. The cathode and the anode electrode substrates, 14 and 15 respectively, are formed of porous, electrically conductive sheet material—typically carbon fiber paper having a Teflon® coating.

The ion exchange membrane 13 has a catalyst layer formed on either side of the membrane 13, thereby forming a catalyst-membrane interface which acts to promote the desired electrochemical reaction. The anode catalyst 16 and the cathode catalyst 8 are typically chosen from one of the noble metals, such as platinum, or a noble metal alloy, such as platinum-ruthenium, or the like. The anode electrode substrate 15 in the fuel cell 12 and the cathode electrode substrate 14 in the fuel cell 11 are then electrically coupled in order to provide a path for conducting electrons between the fuel cells 11 and 12 when an external load is applied.

Still in reference to FIG. 1, fuel is supplied to the anode electrode substrate 15 through the fuel channels 20 formed within an anode flow field plate 18, while an oxidant is supplied to the oxidant channels 19 within a cathode flow field plate 17. The fuel and oxidant together are referred to as reactants. The fuel channels 20 are typically arranged approximately orthogonal to the oxidant channels 19. The fuel channels 20 and oxidant channels 19 may be engraved, milled or molded in the surface of the anode or cathode flow field plates, 18 and 17 respectively, and may be one continuous channel or a plurality of channels. In addition, the fuel and oxidant may be fed through the fuel cell stack 10 utilizing axial feed manifolding, exterior manifolding or a combination of the two.

The anode and cathode flow field plates, 18 and 17, are formed from a porous graphite or a porous graphite-polymer composite, as discussed previously. While the pore size of each of the plates 18 and 17 may differ, typical pore diameters in the plates 18 and 17 range from approximately 1 micrometer to approximately 5 micrometers. Alternatively, a fuel cell 11 wherein only one of the anode and cathode flow field plates, 18 and 17 respectively, is porous or neither is porous, is also contemplated and may be employed without departing from the broader aspects of the present invention.

In operation, hydrogen fuel permeates the porous electrode material of the anode electrode substrate 15 and reacts at the anode catalyst 16 to form protons and electrons.. The protons migrate through the membrane 13 to the cathode catalyst 8. The electrons produced at the anode catalyst 16 in the fuel cell 12 migrate to the cathode catalyst 8 in the fuel cell 11, through both the anode flow field plate 18 of the fuel cell 12 and the cathode flow field plate 17 and the cathode substrate 14 of the fuel cell 11. At the cathode catalyst 8, the oxidant also permeates through the porous electrode material and reacts with the hydrogen ions and the electrons at the catalyst layer 8 to form the by-product water. Not only does the ion exchange membrane 13 facilitate the migration of these hydrogen ions from the catalyst layer 16 to the catalyst layer 8, but the ion exchange membrane 13 also acts to isolate the hydrogen fuel flowing through fuel channels 20 from the oxygen-containing gas oxidant as it moves through the oxidant channels 19.

A coolant, typically water, is supplied to the fuel cells 11 and 12 through coolant channels 21 formed in the anode and cathode flow field plates, 18 and 17 respectively, for the purpose of relieving the fuel cells 11 and 12 of excess heat generated by the electrochemical reaction taking place within fuel cells 11 and 12, as well as for humidifying the reactants and providing for the removal of by-product water. Alternatively, a fuel cell 11 wherein only one of the anode and cathode flow field plates, 18 and 17 respectively, has coolant channels 21 formed therein, is also contemplated and may be employed without departing from the broader aspects of the present invention.

While a proton exchange membrane, noble metal catalyst and carbon fiber paper having a Teflon® coating have been described, the present invention is not limited in this regard as other membranes and electrode materials may be alternatively utilized, providing they allow for the necessary flow of reactant and by-product molecules and ions. Likewise, fuel cells having an non-solid acid based electrolyte or other fuel cell configurations, such as are disclosed in commonly assigned U.S. Pat. No. 4,769,297 issued to Reiser et al. and U.S. Pat. No. 5,503,944 issued to Meyer et al., herein incorporated by reference in their entirety, may also be employed without departing from the broader aspects of the present invention.

FIG. 2 illustrates a section taken along line A of FIG. 1 showing a plan view of the anode side of, for. example, the fuel cell 11, including the fuel channels 20 of the anode flow field plate 18. As can be seen from FIG. 2, a, fuel supply 22 is supplied to one half of the fuel cell 11 and travels the length of the fuel channels 20. As the fuel supply 22 exits fuel cell 11, the fuel supply 22 is directed towards the downstream side of the fuel cell 11 by an unillustrated fuel turn manifold. In this way, the fuel supply 22 is exposed to the entire anode side of the fuel cell 11. It should be readily apparent that were the single fuel cell 11 but one in a stack of fuel cells, one half of each fuel cell so stacked would receive the fuel supply 22 initially, while the other half of each fuel cell in the stack would receive fuel supply 22 after redirection by the unillustrated fuel turn manifold. Additionally, FIG. 2 shows axial inlet and exhaust coolant manifolds, 23 and 24 respectively, which are utilized for supplying a water coolant to a plurality of coolant channels 21. The architecture of FIG. 2 represents a two-pass flow system owing to the fuel supply 22 making two passes across the surface of the fuel cell 11. A greater number of passes may also be arranged with a corresponding increase in fuel turn manifolds, as is known to those so skilled in the art. A gas impermeable seal 9 extends the length of the fuel cell 11 and serves to isolate the fuel supply 22 on one side of the fuel cell 11 from the fuel supply 22 on the other side of the fuel cell 11. As will be readily appreciated, as the number of passes that the fuel supply 22 makes over the fuel cell 11 increases, so does the number of gas impermeable seals 9 also increase.

FIG. 3 illustrates a section taken along line C of FIG. 1 showing a plan view of the cathode side of, for example, the fuel cell 11, including the oxidant channels 19 of the cathode flow field plate 17. As can be seen from FIG. 3, an oxidant stream 25 is supplied to one entire side of the fuel cell 11 and travels the length of the oxidant channels 19 until emerging at the far side thereof. In this way the entire cathode side of the fuel cell 11 is exposed to the oxidant stream 25 without the use of an oxidant turn manifold. It should be readily apparent, however, that the oxidant fuel stream 25 may also be configured to incorporate an oxidant turn manifold to produce an oxidant flow pattern similar to the fuel supply pattern as illustrated in FIG. 2. Additionally, FIG. 3 also shows axial inlet and exhaust coolant manifolds, 23 and 24 respectively, which are utilized for supplying a coolant such as water to a plurality of coolant channels 21.

It should be readily apparent that the anode and cathode flow field plates, 18 and 17, may alternatively have any number of fuel and oxidant channels, linear or not, as long as the fuel cell 11 is approximately uniformly supplied with these reactants.

With reference once again to FIG. 1, as the fuel cell assemblies are placed in electrical communication with one another, such as represented by the orientation of the fuel cell assemblies 11 and 12, a fuel cell stack is created. In light of the structural limitations of a single fuel cell stack, as was discussed previously, the production of very high voltages may demand that multiple fuel cell stacks be coupled to one another. In these cases, each fuel cell stack in the resultant fuel cell power plant would typically have its own fuel inlet and exhaust manifolds, oxidant inlet and exhaust manifolds and coolant inlet and exhaust manifolds. Such fuel cell power plants invariably suffer from weight and volume concerns, as well as complicating the uniform delivery of reactants to each of the fuel cell assemblies in the fuel cell stacks.

Figure 4:
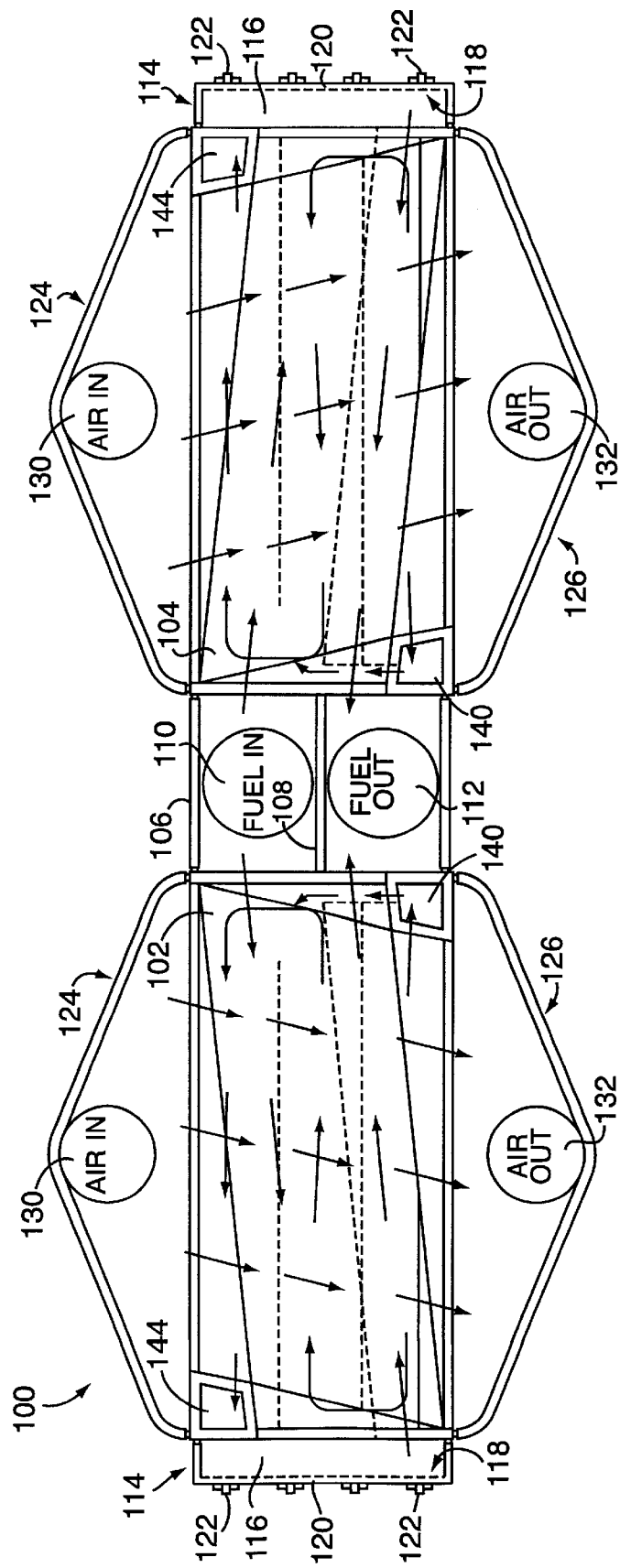
FIG. 4 illustrates a cross-sectional plan view of two fuel cell stacks making up a fuel cell power plant having a common, integrated fuel manifold, according to one embodiment of the present invention.

It is a major aspect of the present invention, therefore, to provide a fuel cell power plant with an integrated manifold system to address these concerns of excessive weight and volume. FIG. 4 illustrates a cross-sectional plan view of one such integrated fuel cell power plant 100 according to the preferred embodiment of the present invention. While a fuel cell power plant 100 including multiple fuel cell stacks is shown in FIG. 4, it will be readily apparent that the method and apparatus for integrating the manifold systems of multiple fuel cell stacks is operable in conjunction with multiple fuel cell assemblies as well.

As shown in FIG. 4, the fuel cell power plant 100 includes two operatively connected fuel cell stacks, 102 and 104 respectively, which share a common, integrated fuel inlet and exhaust manifold 106. The integrated fuel inlet and exhaust manifold 106 is positioned so as to be in gaseous communication with each of the fuel cell stacks, 102 and 104, and is preferably formed from a lightweight dielectric reinforced plastic, such as but not limited to glass filled NORYL™ or the like. An inner separator baffle 108 is adapted to formed within the inlet and exhaust manifold 106 and extends the length thereof, effectively bifurcating the inlet and exhaust manifold 106 into separate plenums. As depicted in the arrangement of FIG. 4, the inlet and exhaust manifold 106 is utilized to provide a commonly integrated inlet and exhaust manifold for a reactant fuel, typically hydrogen or a hydrogen rich fuel. The inner separator baffle 108 is gas impermeable to ensure that inputted and exhausted fuel flows are separated from one another within the inlet and exhaust manifold 106.

During operation, the fuel is provided to the integrated fuel inlet and exhaust manifold 106 via a fuel inlet 110, and is thereby simultaneously diverted by the inner separator baffle 108 to one half of each of the fuel cell assemblies comprising each of the fuel cell stacks, 102 and 104. As the inputted fuel exits a first half of each of the fuel cell assemblies comprising the fuel cell stacks, 102 and 104, a pair of fuel turn manifolds 114 redirects the fuel to the remaining half of each of the fuel cell assemblies. The circulated fuel is subsequently exhausted from the integrated fuel inlet and exhaust manifold 106 via a fuel exhaust 112. The fuel cell power plant 100 as illustrated in FIG. 4 is commonly referred to as a two-pass flow system owing to the reactant fuel making two passes across the surfaces of the fuel cell assemblies in each of the two fuel cell stacks 102 and 104. While a two-pass flow system has been described, the present invention is not limited in this regard as any number of passes may be accomplished without departing from the broader aspects of the present invention.

The fuel turn manifolds 114 are preferably formed as a pair of opposing honeycombed, lightweight aluminum frames 120 capable of withstanding the pressure of the circulating fuel. A pair of lightweight rails 116 are formed on either distal end of each of the frames 120, also preferably formed from a dielectric reinforced plastic or the like, which effectively cap each of the fuel turn manifolds 114. Further, the inner portions of the fuel turn manifolds 114, as well as the inner portions of the lightweight rails 116 which come into contact with the circulating fuel, are treated with a corrosion resistant coating or lining 118. A plurality of tie rods 122 extend between the opposing frames 120 and are affixed thereto in any conventional manner so as to draw the fuel turn manifolds 114 and the fuel cell stacks 102 and 104 into gas-tight communication with one another.

While aluminum and dielectric reinforced plastic have been cited as materials from which the fuel turn manifolds 114 and the lightweight rails 116 may be respectively formed, the present invention is not limited in this regard as either material may be utilized without departing from the broader aspects of the present invention.

The fuel cell power plant 100 is also equipped with one-pass oxidant flow system having a pair of exterior oxidant inlet manifolds 124 and a pair of exterior oxidant exhaust manifolds 126, as well as a pair of interior coolant inlet manifolds 140 and a pair of coolant exhaust manifolds 144. As will be appreciated by one so skilled in the art, multipass oxidant flow configurations are also contemplated by the present invention. A reactant oxidant, typically air or an oxygen-containing gas, is provided to the fuel cell stacks 102 and 104 via a pair of oxidant inlets 130 and passed through the fuel cell stacks, 102 and 104, until being exhausted from the fuel cell power plant 100 via a pair of oxidant exhausts 132. It should be readily apparent that each of the exterior manifolds, 106, 114, 124 and 126 respectively, are sealed to the fuel cell power plant 100 in any conventional manner so as to provide a gas-tight environment capable of withstanding the pressure of the circulating reactants.

As can be seen from FIG. 4, it is a major aspect of the present invention to utilize a common fuel inlet and exhaust manifold 106, as opposed to the known use of separate inlet and exhaust manifolds for each reactant supplied to the fuel cell stacks 102 and 104. The use of a single fuel inlet and exhaust manifold 106 substantially reduces the weight and volume of the fuel cell power plant 100 as a whole. In addition, by utilizing the inner separator baffle 108, the single fuel inlet and exhaust manifold 106 is configured such that an approximately equal amount of fuel, within a range of approximately +/−5%, is provided to each of the fuel cell stacks, 102 and 104, simultaneously. An equal distribution of fuel reduces current fluctuations within the fuel cell power plant 100, stabilizes voltage generation and extends the intervals between routine maintenance of the fuel cell power plant 100. Moreover, by operating the fuel cell power plant 100 by way of only a single fuel inlet 110 and a single fuel exhaust 112, the structural complexity of the fuel cell power plant 100 is greatly reduced, which further diminishes the over-all weight and volume of the fuel cell power plant 100.

Figure 5:
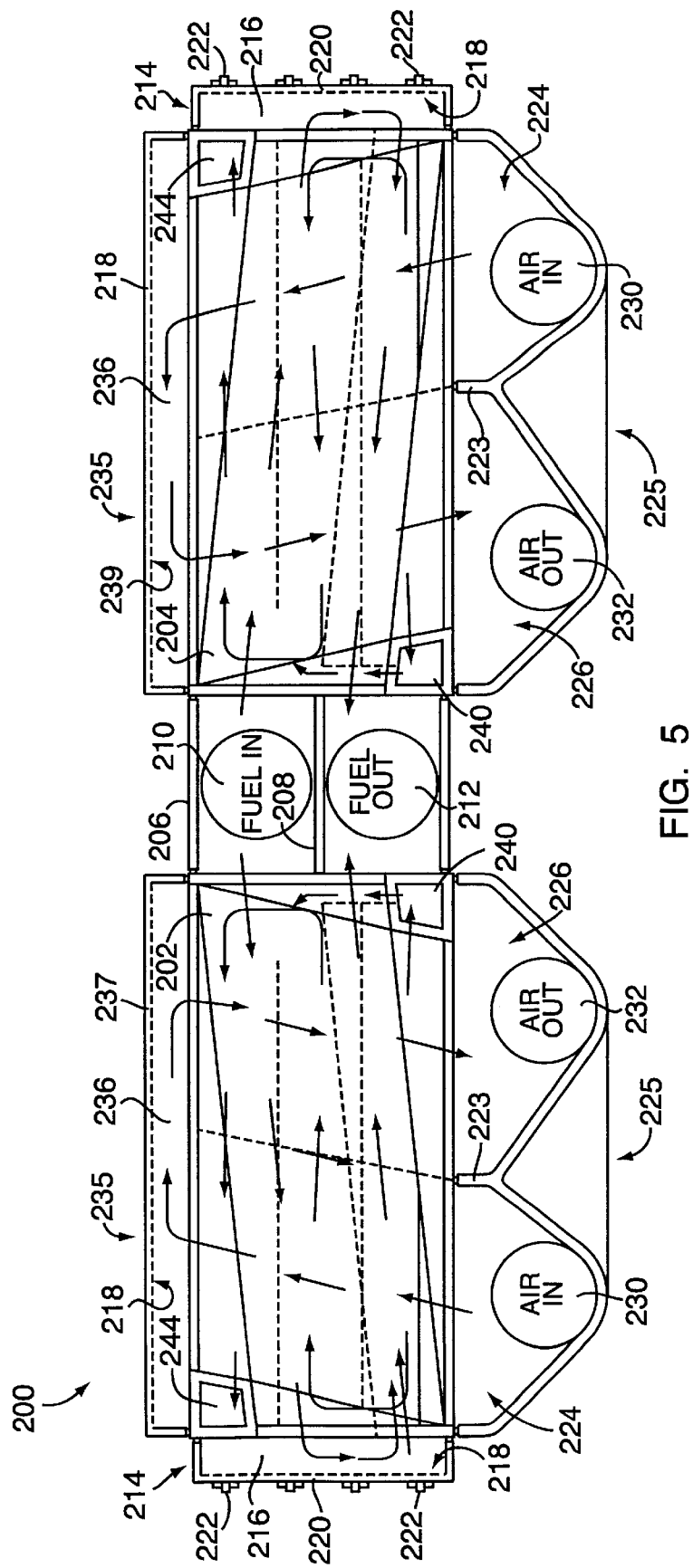
FIG. 5 illustrates a cross-sectional plan view of two fuel cell stacks making up a fuel cell power plant having a common, integrated fuel manifold, as well as a pair of integrated oxidant inlet and exhaust manifolds, according to another embodiment of the present invention.

FIG. 5 illustrates a cross-sectional plan view of an integrated fuel cell power plant 200 according to another embodiment of the present invention. While similar to the integrated manifold systems of the fuel cell power plant 100 of FIG. 4, the embodiment depicted in FIG. 5 is equipped with a pair of integrated oxidant inlet and exhaust manifolds 225 as well as having a common, integrated fuel inlet and exhaust manifold 206.

As shown in FIG. 5, the fuel cell power plant 200 includes two operatively connected fuel cell stacks, 202 and 204 respectively, which share a common integrated fuel inlet and exhaust manifold 206. The integrated fuel inlet and exhaust manifold 206 is positioned so as to be in gaseous communication with each of the fuel cell stacks, 202 and 204, and is preferably formed from a lightweight dielectric reinforced plastic, such as but not limited to glass filled NORYL™ or the like. An inner separator baffle 208 is adapted to formed within the inlet and exhaust manifold 206 and extends the length thereof, effectively bifurcating the inlet and exhaust manifold 206 into separate plenums. As depicted in the arrangement of FIG. 5, the inlet and exhaust manifold 206 is utilized to provide a commonly integrated inlet and exhaust manifold for a reactant fuel, typically hydrogen or a hydrogen rich fuel. The inner separator baffle 208 is gas impermeable to ensure that inputted and exhausted fuel flows are separated from one another within the inlet and exhaust manifold 206.

During operation, the fuel is provided to the integrated fuel inlet and exhaust manifold 206 via a fuel inlet 210, and is thereby simultaneously diverted by the inner separator baffle 208 to one half of each of the fuel cell assemblies comprising each of the fuel cell stacks, 202 and 204. As the inputted fuel exits a first half of each of the fuel cell assemblies making up the fuel cell stacks, 202 and 204, a pair of fuel turn manifolds 214 redirects the fuel to the remaining half of each of the fuel cell assemblies. The circulated fuel is subsequently exhausted from the integrated fuel inlet and exhaust manifold 206 via a fuel exhaust 212. The fuel cell power plant 200 as illustrated in FIG. 5 is commonly referred to as a two-pass flow system owing to the reactant fuel making two passes across the surfaces of the fuel cell assemblies in each of the two fuel cell stacks 202 and 204. While a two-pass flow system has been described, the present invention is not limited in this regard as any number of passes may be accomplished without departing from the broader aspects of the present invention.

The fuel turn manifolds 214 are preferably formed as a pair of opposing lightweight aluminum frames 220 capable of withstanding the pressure of the circulating fuel. A pair of lightweight rails 216 are formed on either distal end of each of the frames 220, also preferably formed from a dielectric plastic or the like, which effectively cap each of the fuel turn manifolds 214. Further, the inner portions of the fuel turn manifolds 214, as well as the inner portions of the lightweight rails 216 which come into contact with the circulating fuel, are treated with a corrosion resistant coating 218. A plurality of tie rods 222 extend between the opposing frames 220 and are affixed thereto in any conventional manner so as to draw the fuel turn manifolds 214 and the fuel cell stacks 202 and 204 into gas-tight communication with one another.

The fuel cell power plant 200 is additionally equipped with a two-pass oxidant flow system having a pair of integrated inlet and exhaust oxidant manifolds 225, which themselves are bifurcated by inner partitions 223 so as to form separate inlet oxidant manifolds 224 and exhaust oxidant manifolds 226. A reactant oxidant, typically air or an oxygen-containing gas, is provided to the fuel cell stacks 202 and 204 via a pair of oxidant inlets 230. As the oxidant is passed through a first half of the fuel cell stacks 202 and 204, a pair of oxidant turn manifolds 235 subsequently redirects the oxidant flows to a second half of the fuel cell stacks 202 and 204 until being exhausted from the fuel cell power plant 200 via a pair of oxidant exhausts 232.

The oxidant turn manifolds 235 are preferably formed as a pair of lightweight aluminum frames 237, including a pair of lightweight rails 236 formed on either distal end of each of the frames 237, also preferably formed from a dielectric plastic or the like. The lightweight rails 236 effectively cap each of the oxidant turn manifolds 235. Further, the inner portions of the oxidant turn manifolds 235, as well as the inner portions of the lightweight rails 237 which come into contact with the circulating oxidant are treated with a corrosion resistant coating 218.

A pair of interior coolant inlet manifolds 240 and a pair of interior coolant exhaust manifolds 244 serve to supply the fuel cell power plant 200 with a coolant, typically water, in a manner well known in the art. It should be readily apparent that each of the exterior manifolds, 206, 214, 225 and 235 respectively, are sealed to the fuel cell power plant 200 in any conventional manner so as to provide a gas-tight environment capable of withstanding the pressure of the circulating reactants.

As can be seen from FIG. 5, in addition to the advantages inherent in a single fuel inlet and exhaust manifold 206, as was discussed in conjunction with FIG. 4, the fuel cell power plant 200 further reduces its weight and volume by being adapted to have a pair of integrated fuel inlet and exhaust manifolds 225. Moreover, while there remains two oxidant inlets 230 and two oxidant exhausts 232 in the fuel cell power plant 200, by locating these reactant feed openings on the same side of the fuel cell power plant 200 a reduction in the amount and complexity of the conduits necessary for carrying the oxidant reactant is advantageously accomplished.

Figure 6:
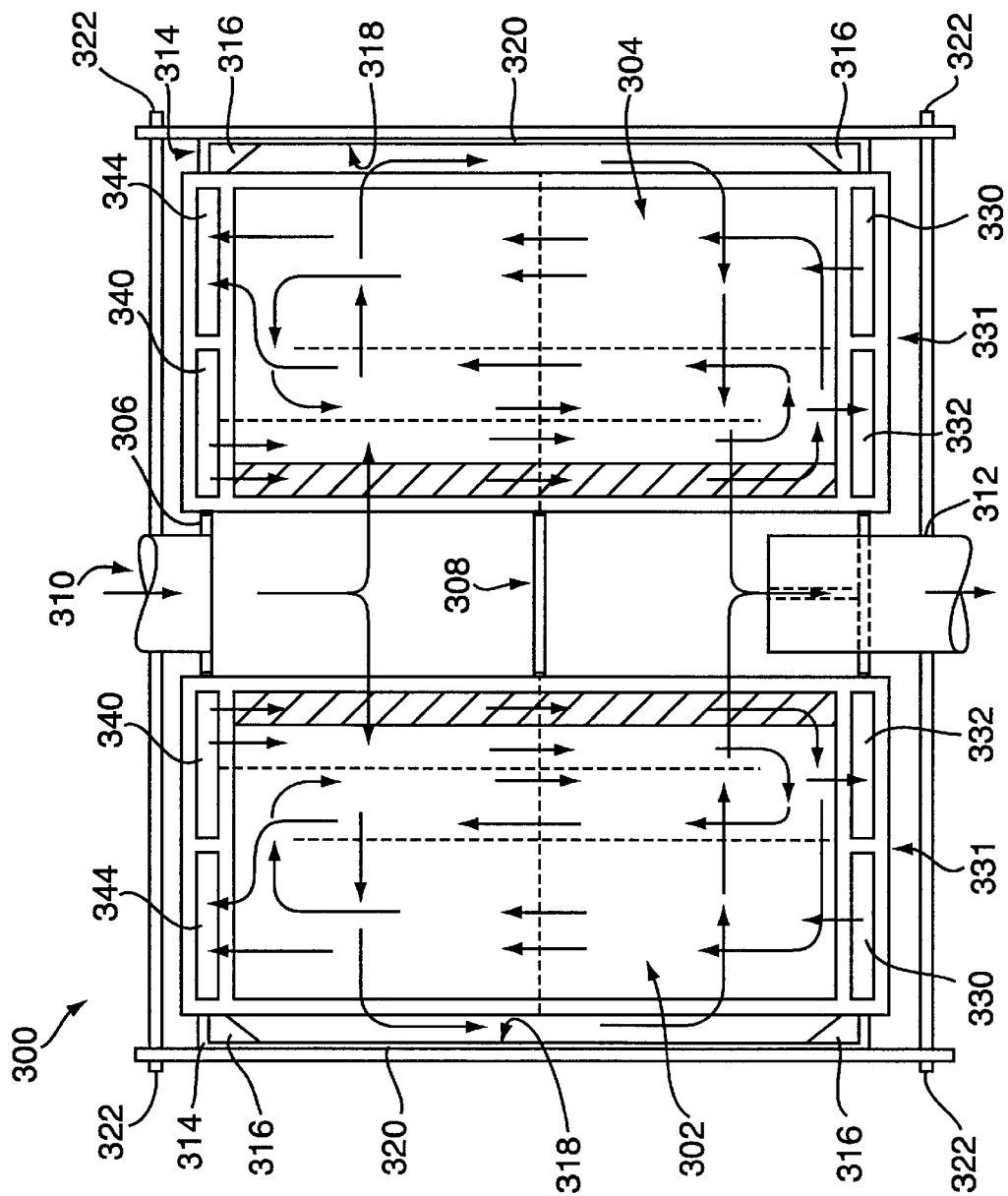
FIG. 6 illustrates a cross-sectional view of two fuel cell stacks making up a fuel cell power plant having a common, integrated oxidant manifold, according to another embodiment of the present invention.

While FIGS. 4 and 5 depict fuel cell power plants having a common, integrated fuel inlet and exhaust manifold, 106 and 206 respectively, the present invention is not limited in this regard as the center-oriented common manifold may alternatively be utilized for the supply and exhaust of an oxidant reactant, without departing from the broader aspects of the present invention. FIG. 6 illustrates a cross sectional view of a fuel cell power plant 300 adapted to have such an integrated oxidant inlet and exhaust manifold.

As shown in FIG. 6, the fuel cell power plant 300 includes two operatively connected fuel cell stacks, 302 and 304 respectively, which share a common, integrated oxidant inlet and exhaust manifold 306. The integrated oxidant inlet and exhaust manifold 306 is preferably formed from a lightweight dielectric reinforced plastic, such as but not limited to glass filled NORYL™ or the like. An inner separator baffle. 308 is adapted to formed within the inlet and exhaust manifold 306 and extends the width thereof, effectively bifurcating the inlet and exhaust manifold 306 into separate plenums. As depicted in the arrangement of FIG. 6, the inlet and exhaust manifold 306 is utilized to provide a commonly integrated inlet and exhaust manifold for a reactant oxidant, typically air or an oxygen-containing gas. The inner separator baffle 308 is gas impermeable to ensure that inputted and exhausted oxidant flows are separated from one another within the inlet and exhaust manifold 306.

During operation, an oxidant is introduced into the integrated oxidant inlet and exhaust manifold 306 at a pressure slightly higher than ambient via an oxidant inlet 310, and is thereby. Simultaneously diverted by the inner separator baffle 308 to one half of each of the fuel cell assemblies comprising each of the fuel cell stacks, 302 and 304. While only a single oxidant inlet 310 is depicted in the cross-sectional view shown in FIG. 6, the present invention is not limited in this regard as there may alternatively be multiple oxidant inlets for supplying the oxidant to the fuel cell power plant 300 without departing from the broader aspects of the present invention.

As the inputted oxidant exits a first half of each of the fuel cell assemblies comprising the fuel cell stacks, 302 and 304, a pair of oxidant turn manifolds 314 redirects the oxidant to the remaining half of each of the fuel cell assemblies. The circulated oxidant is subsequently exhausted from the integrated oxidant inlet and exhaust manifold 306 via an oxidant exhaust 312.

The oxidant turn manifolds 314 are preferably formed as a pair of opposing lightweight aluminum frames 320 capable of withstanding the pressure of the circulating oxidant. A pair of lightweight rails 316 are formed on either distal end of each of the frames 320, also preferably formed from a dielectric plastic or the like, which effectively cap each of the oxidant turn manifolds 314. Further, the inner portions of the oxidant turn manifolds 314, as well as the inner portions of the lightweight rails 316 which come into contact with the circulating oxidant, are treated with a corrosion resistant coating 318. A plurality of tie rods 322 (shown in phantom) extend between the opposing frames 320 and are affixed thereto in any conventional manner so as to draw the oxidant turn manifolds 314 and the fuel cell stacks 302 and 304 into gas-tight communication with one another.

The fuel cell power plant 300 is additionally equipped with a pair of interior fuel inlet and exhaust manifolds 331. This configuration is most applicable to fuel cell power plants that use pure hydrogen as the fuel. A reactant fuel, typically hydrogen or a hydrogen reformed fuel, is provided to the fuel cell stacks 302 and 304 via a pair of fuel inlets 330 at a pressure slightly higher than ambient. The fuel circulates to a second half of the fuel cell stacks 302 and 304 until being exhausted from the fuel cell power plant 300 via a pair of fuel exhausts 332.

A pair of interior coolant inlet manifolds 340 and a pair of interior coolant exhaust manifolds 344 serve to supply the fuel cell power plant 300 with a coolant, typically water, in a manner well known in the art. The manifolds 306 and 314, are sealed to the fuel cell power plant 300 in any conventional manner so as to provide a gas-tight environment capable of withstanding the pressure of the circulating reactants.

As can be seen from FIG. 6, it is a major aspect of the present invention to utilize a common oxidant inlet and exhaust manifold 306, as opposed to the known use of separate inlet and exhaust manifolds for each reactant supplied to the fuel cell stacks 302 and 304. The single oxidant inlet and exhaust manifold 206 thereby reduces the weight and volume of the fuel cell power plant 300 as a whole. In addition, the single oxidant inlet and exhaust manifold 306 is configured such that an approximately equal amount of oxidant, within a range of approximately +/−5%, is provided to each of the fuel cell stacks, 302 and 304, simultaneously. An equal distribution of oxidant helps in reducing current fluctuations within the fuel cell power plant 300, stabilizes voltage generation and extends the interval between routine maintenance of the fuel cell power plant 300. Moreover, by operating the fuel cell power plant 300 by way of only a single oxidant inlet 310 and a single oxidant exhaust 312, the structural complexity of the fuel cell power plant 300 is greatly reduced, which diminishes the over-all weight and volume of the fuel cell power plant 300.

Figure 7:
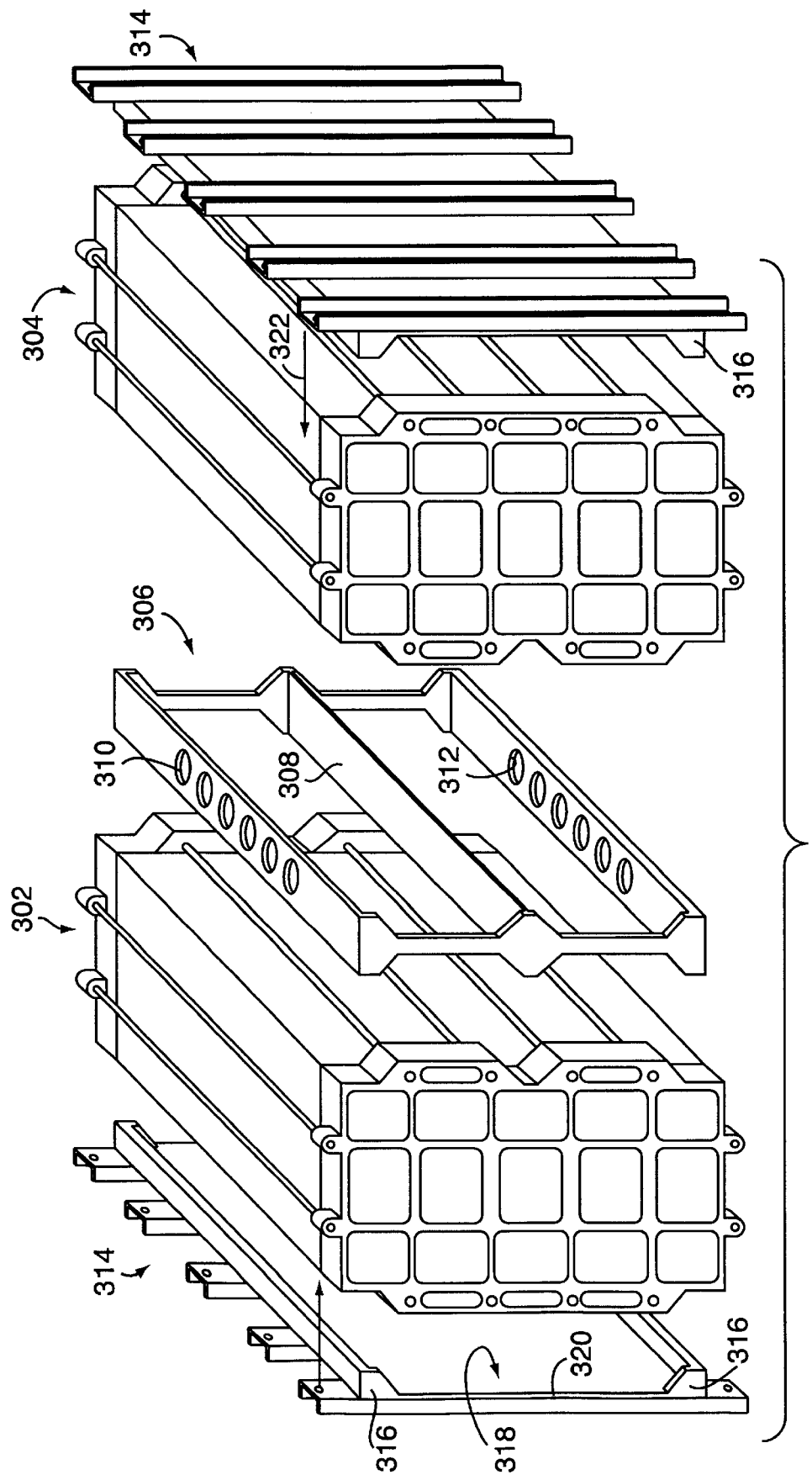
FIG. 7 illustrates an exploded view of the fuel cell power as depicted in FIG. 6.

FIG. 7 depicts an exploded view of the fuel cell power plant 300 for a better illustration thereof. The common oxidant inlet and exhaust manifold 306 is shown in its operative location between each of the fuel cell stacks 302 and 304. As discussed previously, the common oxidant inlet and exhaust manifold 306 may be adapted to have a plurality of oxidant inlets 310 so as to provide a more equal distribution of the oxidant along the length of each of the fuel cell stacks 302 and 304. FIG. 7 additionally illustrates the lightweight siderails 316, similar to the siderails 116 and 216 of FIGS. 4 and 5 respectively, which are utilized to cap the oxidant turn manifolds 314 and thereby provide a gas-tight environment for the inputted oxidant reactant.

Figure 8:
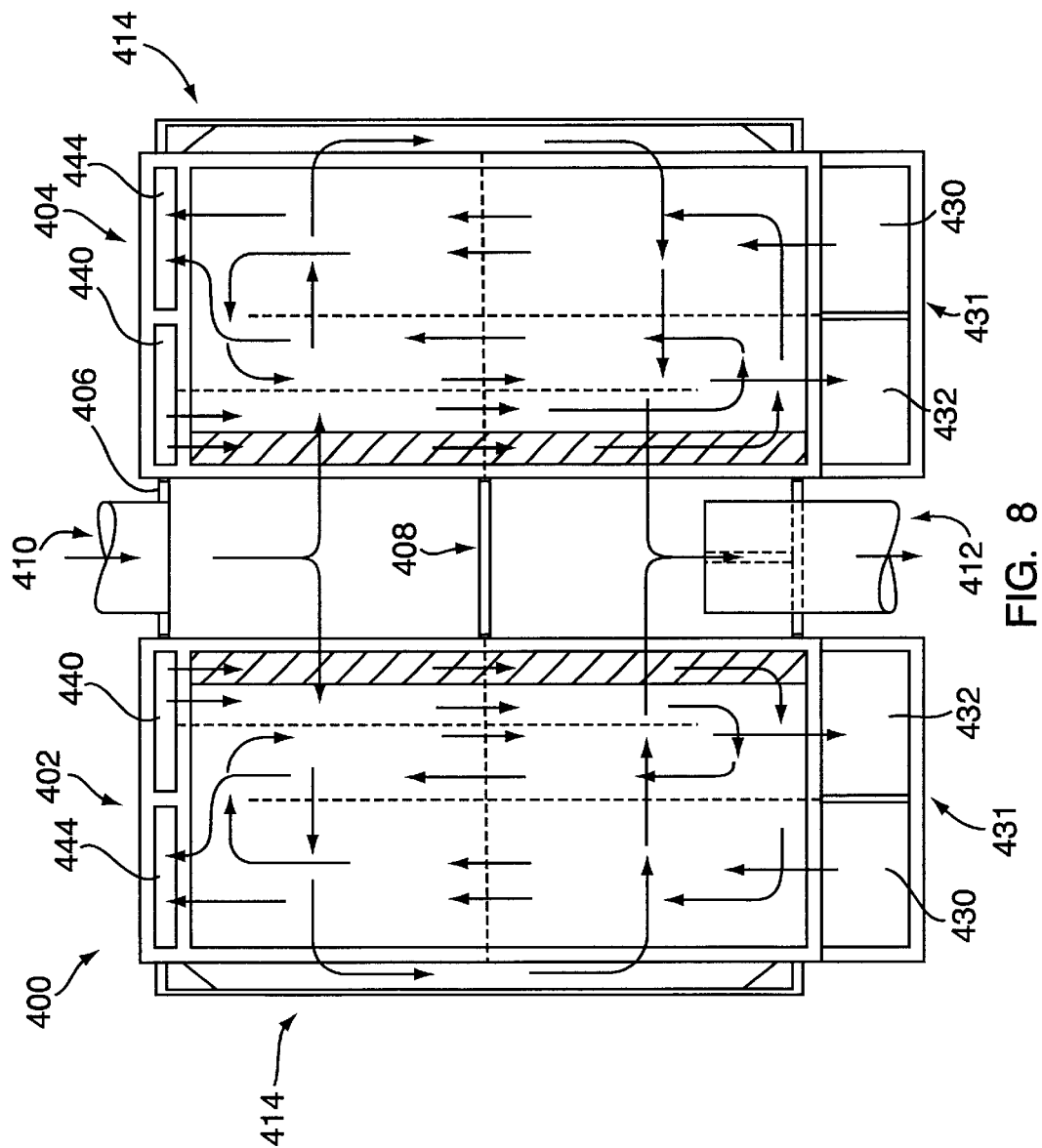
FIG. 8 illustrates a cross-sectional view of two fuel cell stacks making up a fuel cell power plant having a common, integrated oxidant manifold, as well as a pair of integrated fuel inlet and exhaust manifolds, according to another embodiment of the present invention.

FIG. 8 illustrates a cross-sectional view of a fuel cell power plant having an integrated manifold system according to another embodiment of the present invention, generally designated by numeral 400. As shown in FIG. 8, the fuel cell power plant 400 includes two operatively connected fuel cell stacks, 402 and 404 respectively, which share a common, integrated oxidant inlet and exhaust manifold 406. The integrated oxidant inlet and exhaust manifold 406 is preferably formed from a lightweight dielectric reinforced plastic, such as but not limited to glass filled NORYL™ or the like. An inner separator baffle 408 is adapted to formed within the inlet and exhaust manifold 406 and extends the width thereof, effectively bifurcating the inlet and exhaust manifold 406 into separate plenums. Similar to the arrangement of FIG. 6, the inlet and exhaust manifold 406 is utilized to provide a commonly integrated inlet and exhaust manifold for a reactant oxidant, typically air or an oxygen-containing gas. The inner separator baffle 408 is gas impermeable to ensure that inputted and exhausted oxidant flows are separated from one another within the inlet and exhaust manifold 406.

As mentioned, the fuel cell power plant 400 is structured in a similar fashion to the fuel cell power plant 300 of FIG. 6, having an oxidant inlet 410, an oxidant exhaust 412, a pair of oxidant turn manifolds 414, a pair of interior coolant inlet manifolds 440 and a pair of interior coolant exhaust manifolds 444. The fuel cell power plant 400, however, is equipped with a pair of exterior fuel manifolds 431 through which a reactant fuel, typically hydrogen or a hydrogen rich fuel, is provided to the fuel cell stacks 402 and 404 via a pair of fuel inlets 430 at a pressure slightly higher than ambient. The fuel circulates through fuel channels provided in the fuel cell assemblies of the fuel cell stacks 402 and 404, until being exhausted from the fuel cell power plant 400 via a pair of fuel exhausts 432.

Figure 9:
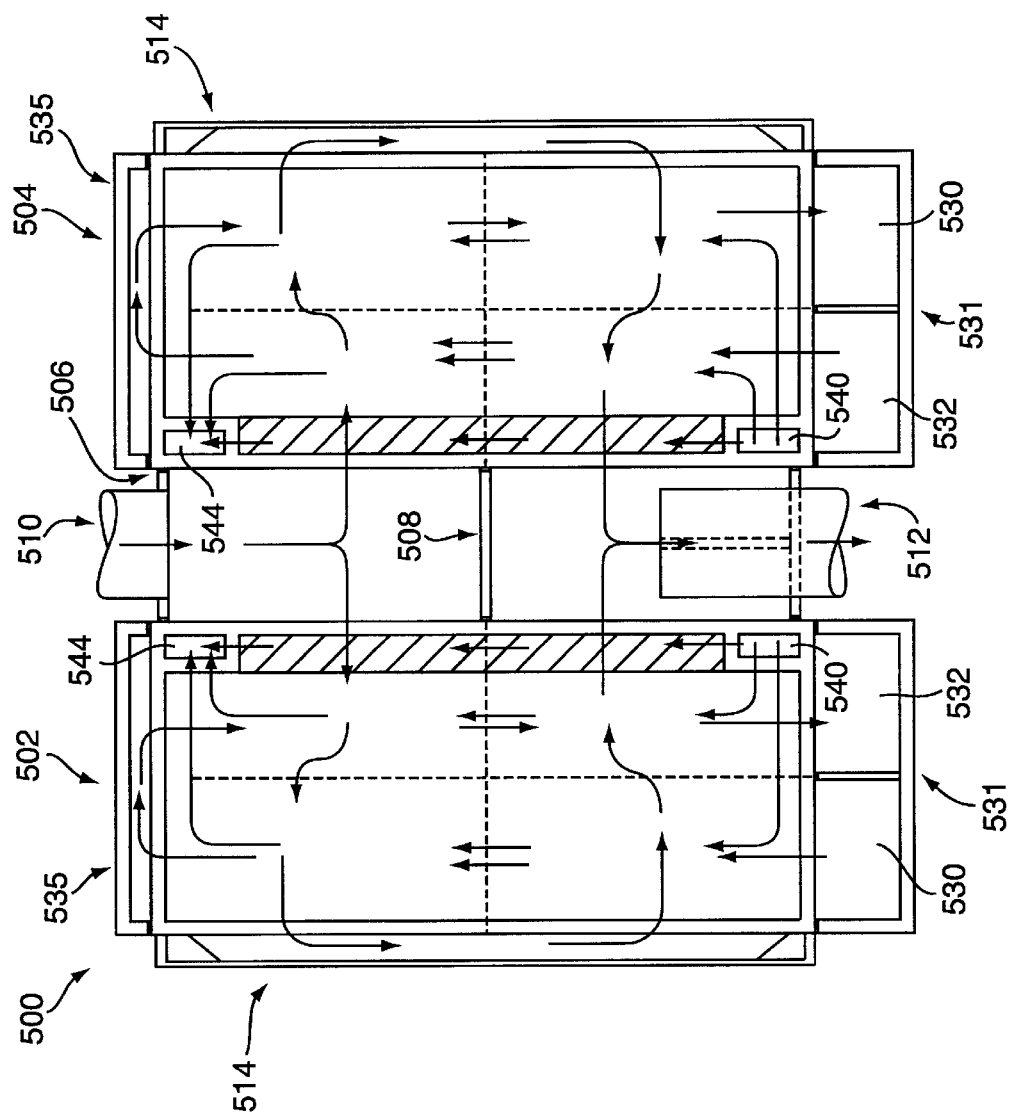
FIG. 9 illustrates a cross-sectional view of two fuel cell stacks making up a fuel cell power plant having a common, integrated oxidant manifold, as well as a pair of integrated fuel inlet and exhaust manifolds, according to another embodiment of the present invention.

FIG. 9 illustrates a cross-sectional view of a fuel cell power plant having an integrated manifold system according to another embodiment of the present invention, generally designated by numeral 500. As shown in FIG. 9, the fuel cell power plant 500 includes two operatively connected fuel cell stacks, 502 and 504 respectively, which share a common, integrated oxidant inlet and exhaust manifold 506. The integrated oxidant inlet and exhaust manifold 506 is preferably formed from a lightweight dielectric reinforced plastic, such as but not limited to glass filled NORYL™ or the like. An inner separator baffle 508 is adapted to formed within the inlet and exhaust manifold 506 and extends the width thereof, effectively bifurcating the inlet and exhaust manifold 506 into separate plenums. Similar to the arrangement of FIGS. 6 and 8, the inlet and exhaust manifold 506 is utilized to provide a commonly integrated inlet and exhaust manifold for a reactant oxidant, typically air or an oxygen-containing gas. The inner separator baffle 508 is gas impermeable to ensure that inputted and exhausted oxidant flows are separated from one another within the inlet and exhaust manifold 506.

The fuel cell power plant 500 is configured to include an oxidant inlet 510, an oxidant exhaust 512, a pair of oxidant turn manifolds 514 a pair of interior coolant inlet manifolds 540 and a pair of interior coolant exhaust manifolds 544. The fuel cell power plant 500, however, is additionally equipped with a pair of exterior fuel manifolds 531 through which a reactant fuel, typically hydrogen or a hydrogen reformed fuel, is provided to a first half of the fuel cell stacks 502 and 504 via a pair of fuel inlets 530 at a pressure slightly higher than ambient. The fuel is redirected to a second half of the fuel cell stacks 502 and 504 by a pair of fuel turn manifolds 535 until being exhausted from the fuel cell power plant 500 via a pair of fuel exhausts 532.

Figure 10:
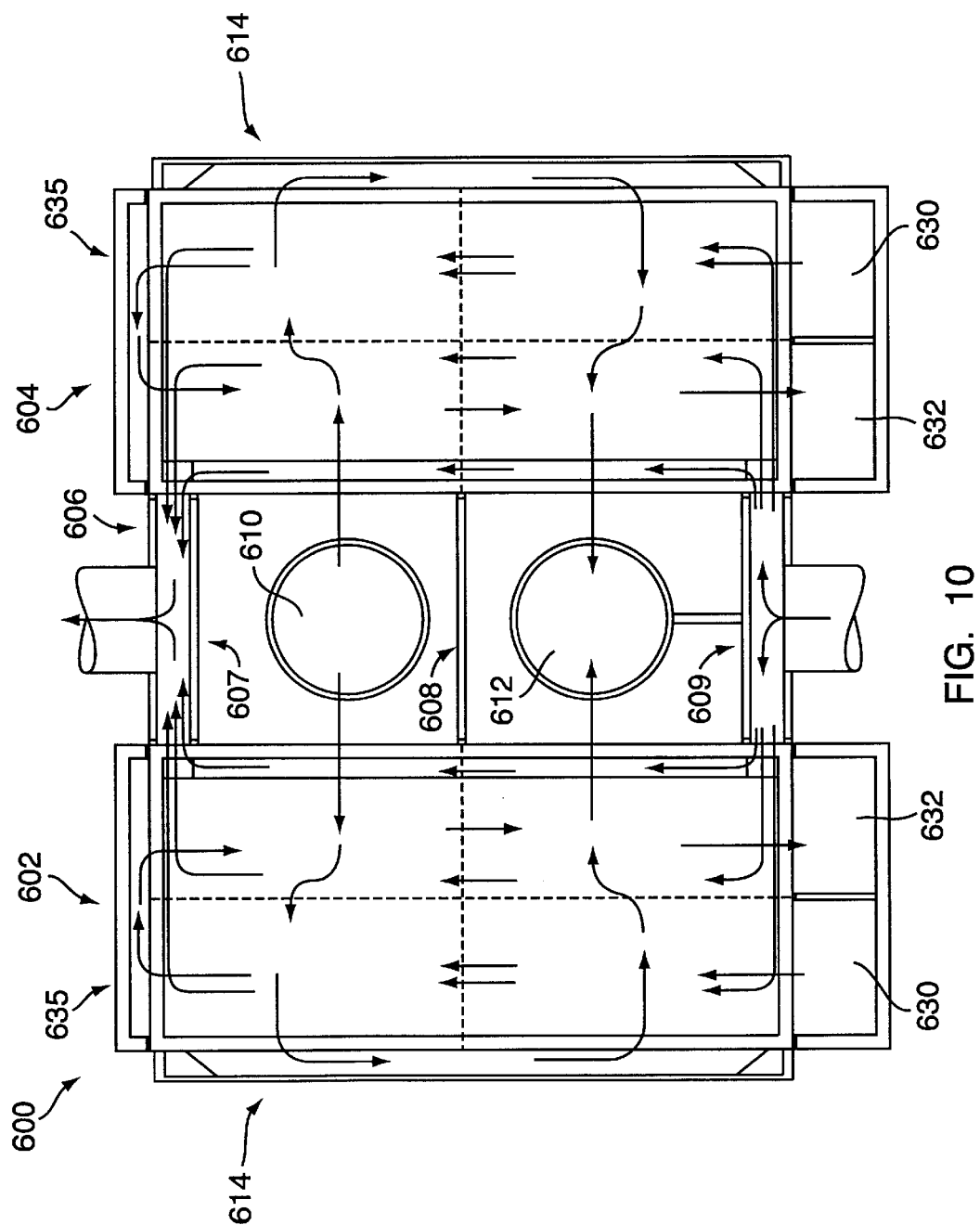
FIG. 10 illustrates a cross-sectional view of a fuel cell power plant having a common, integrated oxidant manifold including integration of a coolant manifold, according to another embodiment of the present invention.

FIG. 10 illustrates a cross-sectional view of a fuel cell power plant having an integrated manifold system according to another embodiment of the present invention, generally designated by numeral 600. As shown in FIG. 10, the fuel cell power plant 600 comprises two operatively connected fuel cell stacks, 602 and 604 respectively, which share a common, integrated oxidant inlet and exhaust manifold 606. The integrated oxidant inlet and exhaust manifold 606 is preferably formed from a lightweight dielectric reinforced plastic, such as but not limited to glass filled NORYL™ or the like. The fuel cell power plant 600 includes an oxidant inlet 610, an oxidant exhaust 612, a pair of oxidant turn manifolds 614, a pair of exterior fuel inlet manifolds 630, a pair of exterior fuel exhaust manifolds 632, and a pair of exterior fuel turn manifolds 635.

The fuel cell power plant 600, however, is further equipped with two coolant baffles, 607 and 609, as well as an inner separator baffle 608. Similar to the previously disclosed embodiments of the present invention, the inner separator baffle 608 is adapted to be formed within the inlet and exhaust manifold 606 and extends the width thereof, effectively bifurcating the inlet and exhaust manifold 606 into separate plenums. With this arrangement, the inner separator baffle 608 simultaneously diverts an inputted reactant oxidant, typically air or an oxygen-containing gas, to a first half of the fuel cell stacks, 602 and 604, before the oxidant is exhausted through the oxidant exhaust 612. The coolant baffles, 607 and 609, also extend the width of the exhaust manifold 606 and provide a channel therein for the influx and exhaust of a circulated coolant, typically water or the like. The coolant baffles, 607 and 609, and the inner separator baffle 608 are gas impermeable to assuredly separate the inputted and exhausted oxidant flows from one another, as well as from the circulated coolant, within the inlet and exhaust manifold 606. In addition to the benefits previously disclosed, the weight and volume of the fuel cell power plant 600 is further reduced by integrating the oxidant inlet and exhausts manifolds with the coolant inlet and exhaust manifolds.

Figure 11:
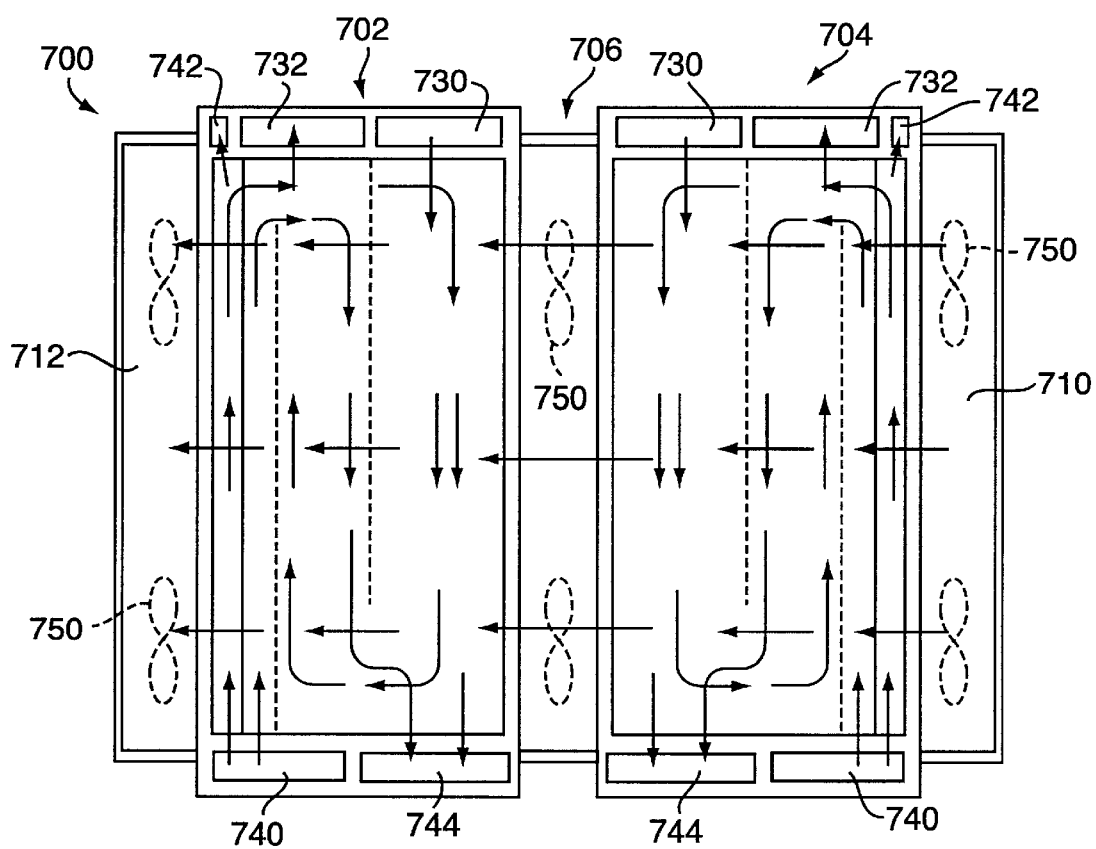
FIG. 11 illustrates a cross-sectional view of a fuel cell power plant having an integrated single-pass oxidant manifold system, according to another embodiment of the present invention.

FIG. 11 illustrates a cross-sectional view of a fuel cell power plant having an integrated manifold system according to another embodiment of the present invention, generally designated by numeral 700. As shown in FIG. 11, the fuel cell power plant 700 comprises two operatively connected fuel cell stacks, 702 and 704 respectively, which share a common, integrated oxidant flow manifold 706. The integrated oxidant flow manifold 706 is preferably formed from a lightweight dielectric reinforced plastic, such as but not limited to glass filled NORYL™ or the like. The fuel cell power plant 700 further includes an oxidant inlet manifold 710, an oxidant exhaust manifold 612, a pair of fuel inlet manifolds 730, a pair of fuel exhaust manifolds 732, a pair of coolant gas vents 742, a pair of coolant inlet manifolds 740 and a pair of coolant exhaust manifolds 744 which, acting in conjunction with one another, provide the fuel cell power plant 700 with the necessary delivery and exhaust of reactant gasses and coolant.

In the embodiment depicted in FIG. 11, the common, integrated oxidant flow manifold 706 is utilized to reduce the overall volume and weight of the fuel cell power plant 700 by acting as a common flow conduit for the passage of an inputted oxidant, typically air or other oxygen-containing gas. A plurality of fans 750 may be alternatively positioned within one or more of the oxidant manifolds, 710, 706 and 712 respectively, for the purposes of ensuring an approximately uniform volume of oxidant flow through each of the fuel cell stacks 702 and 704, such as is disclosed in co-pending U.S. patent application Ser. No. 09/265,139, entitled "METHOD AND APPARATUS FOR IMPROVED DELIVERY OF INPUT REACTANTS TO A FUEL CELL ASSEMBLY", filed on Mar. 8,1999, and herein incorporated by reference in its entirety.

FIGS. 4–11 illustrate many differing embodiments of the present invention, each having slight variations on the location of oxidant, fuel and coolant manifolds, as well as having differing reactant and coolant flow patterns. It is a major aspect of the present invention, however, to provide a common, integrated manifold system which is applicable to a fuel cell power plant regardless of the specific arrangement of the oxidant, fuel and coolant manifolds, or the reactant and coolant flow patterns.

By utilizing such a common, integrated manifold system according to the present invention, the overall weight and volume of an operationally connected fuel cell power plant can be significantly reduced. Moreover, the common, integrated manifold system more uniformly delivers the necessary reactants to the fuel cell stacks comprising the fuel cell power plant. This uniform distribution of reactants increases the operational stability of fuel cell power plant by substantially reducing current and temperature variations within the fuel cell stacks, and hence, more efficient and more reliable fuel cell power plants are advantageously realized.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. An integrated manifold system for a fuel cell power plant, said fuel cell power plant includes a first fuel cell stack and a second fuel cell stack, said system comprising:

a common manifold adapted to be in fluid communication with said first fuel cell stack and said second fuel cell stack, said common manifold being disposed between said first and second fuel cell stacks and adapted to be in gas-tight communication with said first and second fuel cell stacks; and wherein said common manifold includes a first plenum for diverting a first reactant to each of said first and second fuel cell stacks, and a second plenum for accepting said first reactant as said first reactant is exhausted from each of said first and second fuel cell stacks.

2. The integrated manifold system for a fuel cell power plant according to claim 1, wherein:

said common manifold is adapted to have an inner baffle formed therein for bifurcating said common manifold into said first plenum and said second plenum; and said inner baffle is adapted to be gas-impermeable, thereby separating said diverted first reactant from said exhausted first reactant.

3. The integrated manifold system for a fuel cell power plant according to claim 2, wherein:

said common manifold further includes:

a first reactant inlet opening for supplying said first reactant to said first plenum;

a first reactant exhaust opening for exhausting said first reactant from said second plenum; and wherein said inner baffle diverts said first reactant introduced through said first reactant inlet opening to each of said first and second fuel cell stacks.

4. The integrated manifold system for a fuel cell power plant according to claim 3, wherein:

said inner baffle diverts an approximately equal amount of said first reactant to each of said first and second fuel cell stacks.

5. The integrated manifold system for a fuel cell power plant according to claim 4, wherein:

said common manifold and said inner baffle are formed from a dielectric reinforced plastic; and said first reactant is one of a fuel or an oxidant.

6. The integrated manifold system for a fuel cell power plant according to claim 3, wherein:

said first and second fuel cell stacks each further include a second reactant manifold system adapted to be in gas-tight communication with each of said first and second fuel cell stacks; and said second reactant manifold systems are adapted include a second reactant inlet opening for supplying a second reactant to each of said first and second fuel cell stacks, and a second reactant exhaust opening for exhausting said second reactant from each of said first and second fuel cell stacks.

7. The integrated manifold system for a fuel cell power plant according to claim 6, wherein:

said first reactant is one of a fuel or an oxidant;

said second reactant is the other of said fuel and said oxidant; and said second reactant manifold system is one of an exterior manifold or an interior manifold.

8. The integrated manifold system for a fuel cell power plant according to claim 7, wherein:

said common manifold is adapted to include a first coolant baffle formed within said first plenum for diverting a coolant flow to each of said first and second fuel cell stacks, and a second coolant baffle formed within said second plenum for accepting said coolant flow as said coolant flow is exhausted from each of said first and second fuel cell stacks.

9. An integrated manifold system for a fuel cell power plant, said fuel cell power plant includes a first fuel cell stack and a second fuel cell stack, said system comprising:

an input manifold adapted to be in fluid communication with said first fuel cell stack for directing a reactant to said first and second fuel cell stacks;

a common manifold adapted to be in fluid communication with said first fuel cell stack and said second fuel cell stack, said common manifold being disposed between said first and second fuel cell stacks;

an exhaust manifold adapted to be in fluid communication with said second fuel cell stack for accepting said reactant as said reactant is exhausted from said second fuel cell stack; and said fuel cell power plant further includes a fan disposed within one of said inlet manifold, said common manifold and said exhaust manifold.

10. The integrated system for a fuel cell power plant according to claim 9, wherein:

said reactant is an oxidant.

* * * * *